April 28, 1936.  E. LATSHAW  2,039,274
TRUCK WHEEL BRAKE
Filed Dec. 11, 1935  3 Sheets-Sheet 1
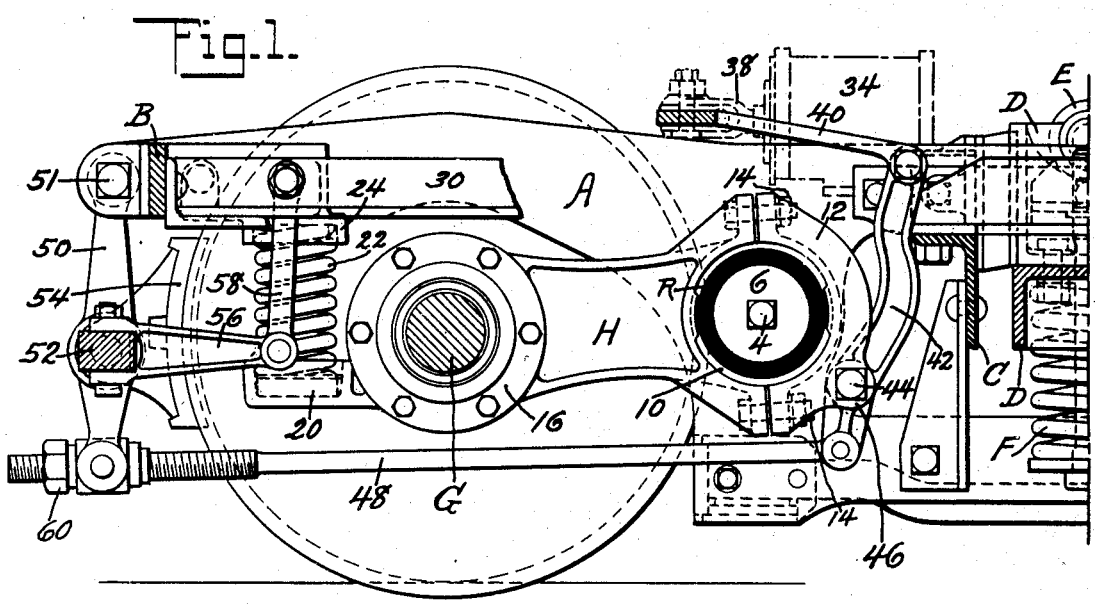
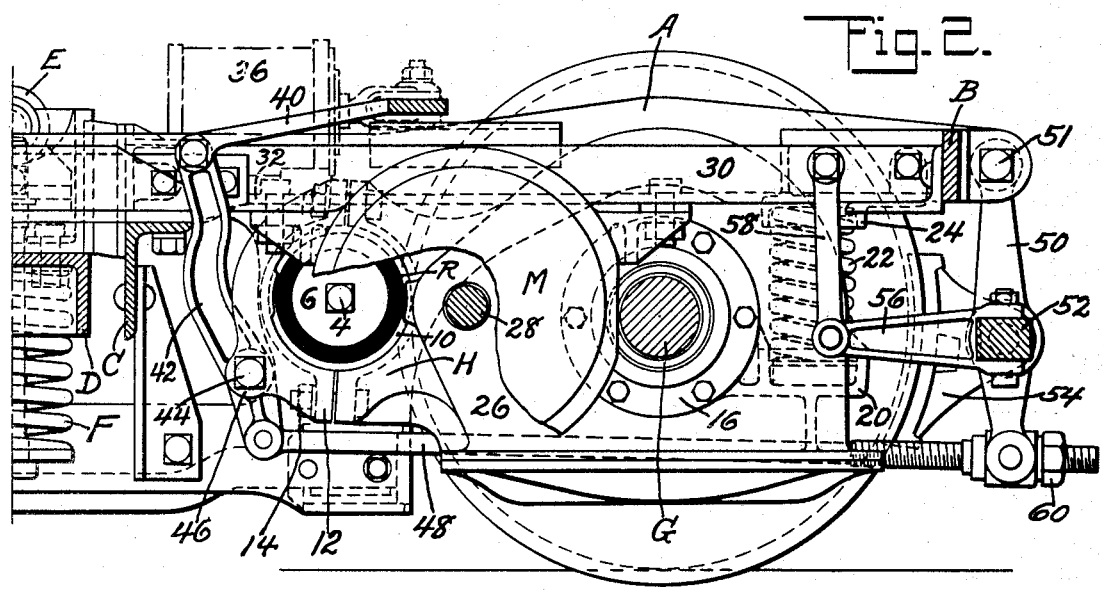
INVENTOR
Elmer Latshaw
BY
Donald U. Rich
ATTORNEY

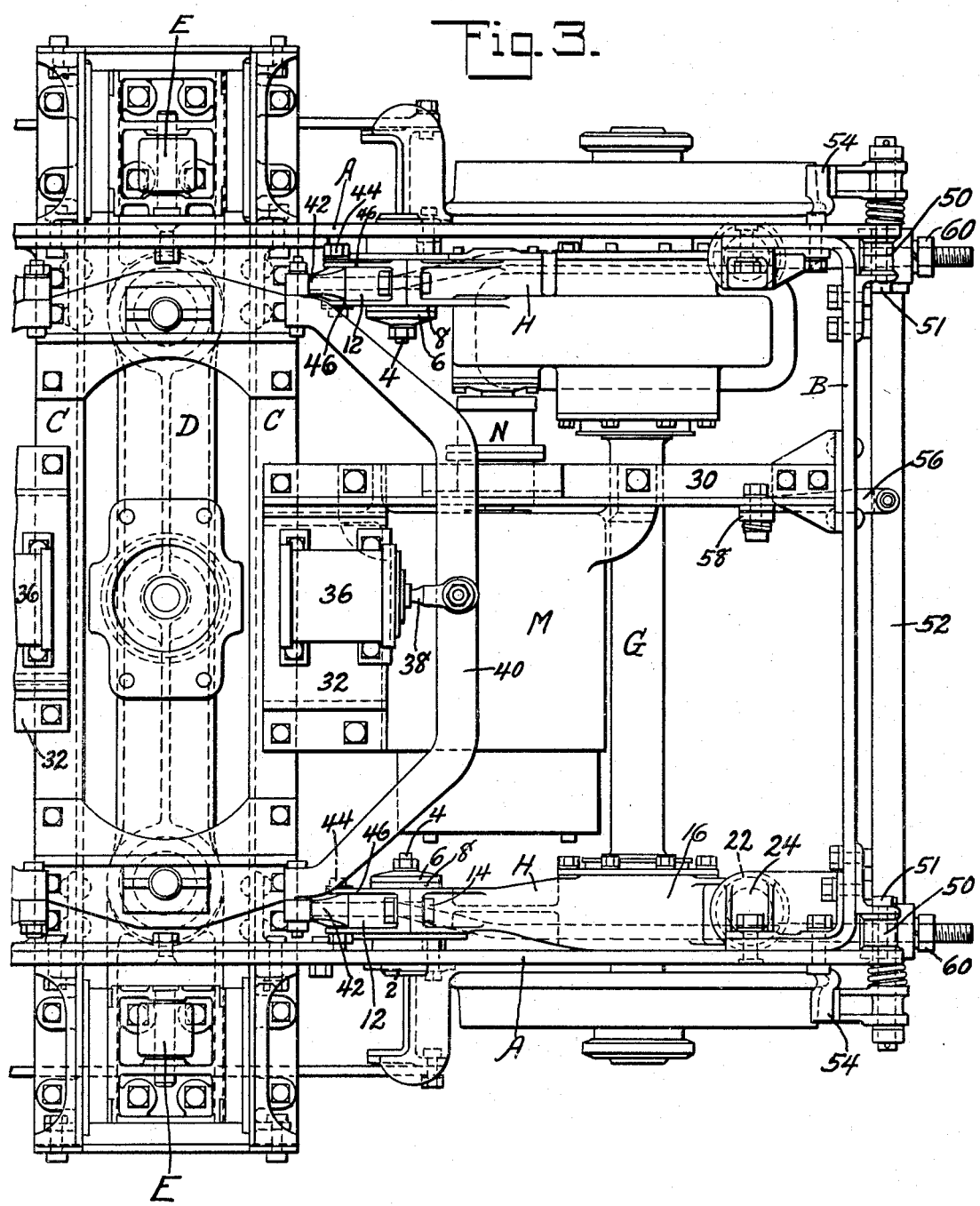

April 28, 1936.  E. LATSHAW  2,039,274

TRUCK WHEEL BRAKE

Filed Dec. 11, 1935  3 Sheets-Sheet 3

INVENTOR
*Elmer Latshaw*
BY
*Donald U. Rich*
ATTORNEY

Patented Apr. 28, 1936

2,039,274

UNITED STATES PATENT OFFICE 2,039,274

TRUCK WHEEL BRAKE

Elmer Latshaw, Philadelphia, Pa., assignor to The J. G. Brill Company, Philadelphia, Pa., a corporation of Pennsylvania Application December 11, 1935, Serial No. 53,868

10 Claims. (Cl. 188—33)

This invention relates generally to improvements in brakes for trucks but in particular to trucks of the pedestalless type.

In pedestalless trucks it is obvious that the means which tie the axles to the trucks must absorb the various strains normally absorbed by the truck pedestals and it is an object of this invention therefore to relieve this means of at least a portion of the strains that might be imposed thereon.

Another object of the invention is the provision of a brake arrangement such that the pivot connecting the axle to the truck is relieved of brake lever reaction.

A further object of the invention is the provision of a brake system for pedestalless trucks wherein the terminal reactions of the system are absorbed by the truck, while all intermediate reactions are absorbed by the truck axle.

A still further object of the invention is the provision of a brake system for pedestalless trucks of the rubber mounted pivot type wherein at least one lever of the system is pivoted to an axle carried member to relieve the rubber of brake reaction forces.

These and other objects of the invention will be apparent to one skilled in the art from a study of the following description and accompanying drawings in which:

Figure 1 is a sectional view taken adjacent the inner side of the truck side frame and disclosing the left half of a truck;

Fig. 2 is a sectional view similar to Fig. 1 but showing the other half of the truck;

Fig. 3 is a plan view of the right half of the truck and

Figure 4:
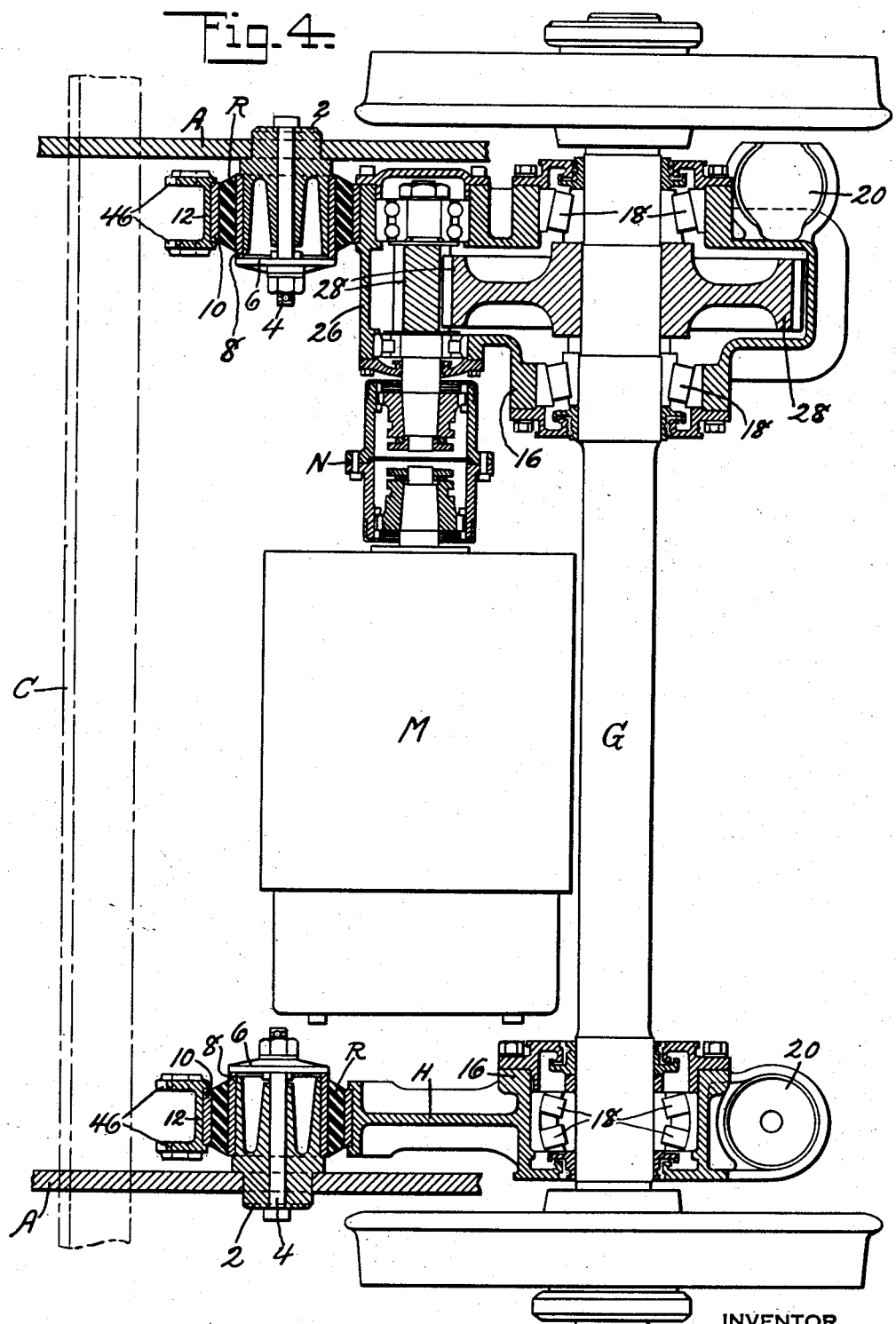
Fig. 4 is a sectional view through the axle controlling member and illustrating details of the pivot construction.

Referring now in detail to the drawings which disclose a truck somewhat similar to that disclosed in Guernsey Serial No. 704,612 filed December 30, 1933. The truck is shown as of the two-axle type with a single motor, but it is obvious that if the truck were of the trailer type both ends of the truck would appear as in Fig. 1, while if both axles were driven then both ends of the truck would appear as in Fig. 2.

The truck is formed with suitable side frames A tied together by crosstie B and transoms C, all suitably braced and secured together in a well known manner. The bolster D having side bearings E carries the car body on the truck through the medium of springs F, and the truck is in turn supported on the axle G by means of axle control arms H.

The axle control arms H are mounted for pivotal movement with respect to the truck by means of trunnion 2 through which extends bolt 4 carrying the cap 6 which adjustably clamps inner sleeve 8 of a rubber bushing unit in the desired position. A rubber ring R is vulcanized to the inner ring and to the outer ring 10 which is suitably clamped to the end of the control arm by cap 12 through the medium of bolts or other means 14. The control arm is provided with an enlarged portion 16 adapted to receive bearings 18 in which the axle is journaled, and a suitable portion of the arm is also provided with a spring pocket 20 designed to receive one end of spring 22, the other end resting in a truck carried spring pocket 24. In cases such as the present where the truck is equipped with a motor at least one of the control arms is modified to provide a gear housing 26 in which the reduction gearing 28 is journaled and protected.

The transoms and crossties are joined together by member 30 which aids in the support of plate 32 carrying the brake cylinders 34 and 36 and this member likewise supports the motor M which drives the gearing through flexible coupling N. The brake cylinders 34 and 36 may be of different sizes for the purpose of obtaining better braking effects as set forth and claimed in my prior Patent 1,896,961 granted February 7, 1933.

The piston rod 39 acts substantially at the center of equalizer bar 40 pivotally carried at its ends by inside brake levers 42 which are pivoted by suitable means 44 to spaced ears 46. These ears are part of the clamping cap 12 and, therefore, may be considered as part of the control arm. The inside brake levers are connected by means of rods 48 to the lower end of outside brake lever 50, the upper end of which is pivoted to the truck frame as at 51. The outside levers also serve as hangers for brake beams 52 carrying brake shoes 54, and the shoes are held in proper position by a leveling device. The leveling device consists of a lever 56 securely fastened at one end of the brake beam, while the other end is suspended by link 58 from the member 30. This linkage, as is evident from Figs. 1 and 2, forms a parallel motion device which insures that the brake beam is held horizontal at all times. Wear on the brake shoes is taken care of by means of a suitable slack adjuster 60 positioned on each pull rod.

It is thus evident that when air is admitted to the brake cylinders the terminal thrusts of the system are absorbed by the truck frame at the plates 32 and pivots 51. It is also evident that the intermediate thrusts are absorbed by the axle through the control arm and wheel from the pivot 44 and brake shoe respectively and that thus no direct brake thrusts are applied to the rubber bushing.

The rubber bushing need not therefore be made larger than is necessary to absorb the torsional strain due to deflection of the spring 22, or the vertical and horizontal thrusts due to the direct load and driving forces.

One form or adaptation of the invention has been described in detail, but it is to be understood that various arrangements and improvements thereof will be evident to one skilled in the art and such arrangements and improvements are contemplated as fall within the scope of the following claims.

What is claimed is:

1. In combination in a truck having wheels and axles in spaced relationship, connected side frames, control arms carried by said axles, means connecting said arms and side frames together for relative movement, a brake system for said truck comprising in part terminal and intermediate members, said terminal members being carried by the frames and said intermediate members being carried by said control arms.

2. In combination in a truck having wheels and axles in spaced relationship, connected side frames, control arms carried by said axles, means connecting said arms and side frames together for relative movement, an independent brake system for each axle of said truck comprising, terminal and intermediate members, said terminal members being carried by the frames, and said intermediate members being carried by said control arms.

3. In combination in a truck having wheels and axles in spaced relationship, connected side frames, control arms carried by said axles, means connecting said arms and side frames together for relative movement, said means comprising in part rubber bushings, a brake system for said truck comprising terminal members, intermediate members and connecting members carried by said first and second mentioned members, said terminal members being carried by the frames, and said intermediate members being carried by said control arms.

4. In combination in a truck having wheels and axles in spaced relationship, connected side frames, control arms carried by said axles, means connecting said arms and side frames together for relative movement, said means comprising in part rubber bushings, a brake system for said truck comprising, terminal members, intermediate members and connecting members carried by said first and second mentioned members, said terminal members being carried by the frames, and said intermediate members being carried by said control arms whereby said bushings are relieved of brake system strains.

5. In combination in a truck having wheels and axles in spaced relationship, connected side frames, control arms carried by said axles, means connecting said arms and side frames together for relative movement, said means comprising, resilient bushings, an independent brake system for each axle of said truck comprising, terminal members, intermediate members and connecting members joining said terminal and intermediate members, said terminal members being carried by the frames and said intermediate members being carried by said control arms.

6. In combination in a truck having wheels and axles in spaced relationship, connected side frames, control arms carried by said axles, means connecting said arms and side frames together for relative movement, said means comprising, resilient bushings, an independent brake system for each axle of said truck comprising, terminal members, intermediate members and connecting members joining said terminal and intermediate members, said terminal members being carried by the frames and said intermediate members being carried by said control arms whereby said bushings are relieved of brake system strains.

7. In combination in a truck having wheels and axles in spaced relationship, connected side frames, means connecting said axles and side frames for relative movement, a brake system for said truck comprising in part, terminal and intermediate members, said terminal members being carried by said frames and said intermediate members being carried by said means.

8. In combination in a truck having wheels and axles in spaced relationship, connected side frames, means connecting said axles and side frames for relative movement, a brake system for said truck comprising in part, terminal and intermediate members, said terminal members being carried by said frames and said intermediate members being carried by said means whereby terminal strains are absorbed by said truck frames and intermediate strains are absorbed by said axle.

9. In combination in a truck having wheels and axles in spaced relationship, connected side frames, means connecting said axles and side frames for relative movement, said means comprising in part rubber bushings, a brake system for said truck comprising in part, terminal and intermediate members, said terminal members being carried by said frames and said intermediate members being carried by said means intermediate said bushings and axle.

10. In combination in a truck having wheels and axles in spaced relationship, connected side frames, means connecting said axles and side frames for relative movement, said means comprising in part rubber bushings, a brake system for said truck comprising in part, terminal and intermediate members, said terminal members being carried by said frames and said intermediate members being carried by said means intermediate said bushings and axles whereby terminal strains are absorbed by said truck frames and intermediate strains are absorbed by said axle independent of said bushings.

ELMER LATSHAW.